United States Patent [19]
Dadgar et al.

[11] Patent Number: 5,852,132
[45] Date of Patent: *Dec. 22, 1998

[54] PROCESS FOR BROMINATING POLYSTYRENIC RESINS

[75] Inventors: Billie B. Dadgar; Donald E. Balhoff; Charles H. Kolich; Meng-Sheng Ao; Homer C. Lin, all of Baton Rouge, La.

[73] Assignee: Albemarle Corporation, Richmond, Va.

[ * ] Notice: The term of this patent shall not extend beyond the expiration date of Pat. No. 5,677,390.

[21] Appl. No.: 872,985

[22] Filed: Jun. 11, 1997

Related U.S. Application Data

[63] Continuation of Ser. No. 727,341, Sep. 26, 1996, Pat. No. 5,677,390.
[51] Int. Cl.⁶ ..................................................... C08F 8/22
[52] U.S. Cl. ........................ 525/355; 525/333.4; 525/356
[58] Field of Search ..................................... 525/355, 356

[56] References Cited

U.S. PATENT DOCUMENTS

| | | | |
|---|---|---|---|
| 1,890,772 | 12/1932 | Dykstra | 260/93.5 |
| 2,199,026 | 4/1940 | Levine et al. | 260/74 |
| 2,823,201 | 2/1958 | Wheaton | 260/93.5 |
| 3,009,906 | 11/1961 | Eichhorn et al. | 260/93.5 |
| 3,039,977 | 6/1962 | Ingram | 260/2.5 |
| 3,050,476 | 8/1962 | Tress et al. | 260/2.5 |
| 3,132,045 | 5/1964 | Hill | 117/138 |
| 3,474,067 | 10/1969 | Praetzel et al. | 260/41 |
| 3,506,741 | 4/1970 | Trepka et al. | 260/889 |
| 3,534,012 | 10/1970 | Dennis | 260/91.5 |
| 3,932,542 | 1/1976 | Gerns | 260/650 R |
| 3,959,398 | 5/1976 | Jalics | 260/650 R |
| 3,975,354 | 8/1976 | Buxbaum et al. | 260/40 R |
| 4,028,486 | 6/1977 | Jalics | 526/293 |
| 4,074,032 | 2/1978 | Naarmann et al. | 526/44 |
| 4,134,221 | 3/1979 | Naarmann et al. | 526/44 |
| 4,137,212 | 1/1979 | Theysohn et al. | 260/37 N |
| 4,151,223 | 4/1979 | Neuberg et al. | 260/873 |
| 4,178,327 | 12/1979 | Hall et al. | 525/169 |
| 4,200,703 | 4/1980 | Diebel et al. | 525/357 |
| 4,352,909 | 10/1982 | Barda et al. | 525/157 |
| 4,360,455 | 11/1982 | Lindenschmidt et al. | 252/609 |
| 4,389,517 | 6/1983 | Priddy et al. | 526/64 |
| 4,501,859 | 2/1985 | Newman et al. | 525/356 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,636,554 | 1/1987 | Tada et al. | 525/359.3 |
| 4,650,832 | 3/1987 | Kowalski et al. | 525/354 |
| 4,832,873 | 5/1989 | Favstritsky et al. | 252/601 |
| 4,835,222 | 5/1989 | Sypniewski | 525/359.5 |
| 4,879,353 | 11/1989 | Sanders et al. | 525/357 |
| 4,975,496 | 12/1990 | Tigner et al. | 525/357 |
| 5,112,897 | 5/1992 | Dever et al. | 524/412 |
| 5,112,898 | 5/1992 | Dever et al. | 524/412 |
| 5,122,896 | 5/1992 | Dever et al. | 524/412 |
| 5,194,482 | 3/1993 | Chundury et al. | 524/412 |
| 5,235,000 | 8/1993 | McKinnie | 525/355 |
| 5,304,618 | 4/1994 | Atwell et al. | 526/293 |
| 5,326,837 | 7/1994 | Kissin | 526/150 |
| 5,328,983 | 7/1994 | Favstritsky et al. | 528/490 |
| 5,532,322 | 7/1996 | Kadono et al. | 525/357 |
| B1 4,200,703 | 7/1987 | Diebel et al. | 525/340 |

FOREIGN PATENT DOCUMENTS

| | | |
|---|---|---|
| 0201411 | 12/1986 | European Pat. Off. . |
| 61-034723 | 8/1986 | Japan . |
| 2215807 | 8/1990 | Japan . |
| 1589700 | 5/1981 | United Kingdom . |
| WO9503341 | 2/1995 | WIPO . |

*Primary Examiner*—Bernard Lipman
*Attorney, Agent, or Firm*—E. E. Spielman, Jr.

[57] ABSTRACT

This invention features a process for brominating styrenic polymers, which process comprises forming a reaction mass by feeding a mixture, (i) which is substantially free of a bromination catalyst and (ii) which is formed from at least brominating agent and a styrenic polymer, to a catalytic quantity of a bromination catalyst.

29 Claims, 1 Drawing Sheet

PROCESS FOR BROMINATING POLYSTYRENIC RESINS

This application is a continuation of application Ser. No. 08/727,341, filed Sep. 26, 1996, now U.S. Pat. No. 5,677,390.

BACKGROUND OF THE INVENTION

This invention relates to an economical and safe process for producing high quality brominated polystyrenic resins.

Brominated polystyrenic resins, i.e., polymers containing alkenyl aromatic repeating units, are useful flame retardants. Particularly useful are brominated polystyrenes, especially those containing at least about 60 wt % bromine. High value is placed on brominated polystyrene which has close to 70 wt % bromine and a near-white color. This highly valued product is not easily obtained as most processes are limited by the inverse correlation between high bromine content and good color. In addition to obtaining a high bromine content and good color, the brominated resin should have no or at least a very low degree of cross-linking present.

Most processes for brominating styrenic polymers feature contacting a brominating agent, e.g., bromine, BrCl and the like, with a solution of the styrenic polymer in the presence of a Lewis acid catalyst, such as $AlCl_3$, $AlBr_3$, $FeCl_3$, and $FeBr_3$. Using this basic model, the art has, over the years, strived to divine the best possible process. Success has not been easy as the various proposed processes have not fully fulfilled their promise.

U.S. Pat. No. 4,975,496 describes an intriguing process for brominating styrenic polymers to obtain a high quality product in good yields. The process features contacting a solution of at least one styrenic polymer with a brominating agent in the presence of a Lewis acid catalyst, wherein both the styrenic polymer and the brominating agent are separately fed into contact with the Lewis acid catalyst. The '496 patent stresses the importance of the separated feeds. When the catalyst used is very active, say $AlCl_3$, it is also deemed critical to insure a thorough dispersion of some of the brominating agent in the catalyst before the styrenic polymer is fed. Thus, it is recommended that at least 5 mole percent of the total brominating agent be pre-added to the reactor.

The '496 process, while it may be an improvement over the prior art processes, is not a panacea. In a study of the bromination of polystyrene, it was concluded that processes which use separate brominating agents and polystyrene feeds, as is taught by the '496 patent, run the danger of experiencing vapor eruptions which can cause the reactor contents to be splashed to the top of the reactor and/or into the reflux and feed trains. It is believed that the intensity of these eruptions will be highest where the more active catalysts are used and/or where the reaction conditions favor vigorous bromination. Also, it is predicted that the problem of vapor eruptions will be most serious in commercial-size reactors, say from about 500 to about 6,000 gal. reactors, since such reactors cannot be, from a practical viewpoint, as highly stirred as can be smaller reactors.

The vapor eruption is the result of poor heat and mass transfer. When the brominating agent feed is separate from the styrenic polymer feed and the reactor is large and not highly stirred, there are good opportunities for highly concentrated, large amounts of the two reactants to meet. The resulting exothermic reaction, without good heat transfer, can cause vaporization of some of the reaction solvent. Also, the bromination reaction produces HBr as a gaseous by-product which contributes to the total vapor volume. When the combined vapor volume is large and localized, there can be expected the above-mentioned eruption.

It is, therefore, an object of this invention to provide a process for brominating styrenic polymers, which process is safe from vapor eruptions and which produces a brominated styrenic polymer having excellent color, high bromine content and little cross-linking.

THE INVENTION

This invention features a process for brominating styrenic polymers, which process comprises forming a reaction mass by feeding a mixture (i) which is substantially free of a bromination catalyst and (ii) which is formed from at least a brominating agent and a styrenic polymer, to a catalytic quantity of a bromination catalyst.

Since some styrenic polymers are solids or are quite viscous at feed temperatures, it is preferred that the mixture additionally include a solvent capable of solubilizing the styrenic polymer.

The phrase, "substantially free of a bromination catalyst", is to be taken to mean less than a catalytically effective amount of catalyst. With such low amounts, little or no catalyzed bromination or cross-linking should occur. Generally, such amounts will be less than 500 ppm (weight basis) of styrenic polymer present.

By practicing the process of this invention in the above-described manner, several benefits are realized. First, by having the brominating agent and styrenic polymer reactants fed as a mixture, the formation of large volumes of vapor and the eruption of same are obviated. Second, it has been demonstrated that by using a feed mixture formed from a brominating agent and a styrenic polymer, the most active bromination catalyst can be used without having to practice prior art techniques to protect against cross-linking of the styrenic polymer. For example, so as to guard against cross-linking when $AlCl_3$ is the catalyst, there is no need to pre-add bromine to the reactor as is taught in U.S. Pat. No. 4,975,496. Nor is there a need to add a Lewis base, e.g., water, to the reaction vessel to control cross-linking as is taught in U.S. Pat. No. 4,200,703. Nor is there a need to use a less active catalyst in an anhydrous system to tame cross-linking as is taught in U.S. Pat. No. 4,352,909. Third, by forming a mixture from the brominating agent and styrenic polymer reactants, especially a homogenous mix, there is avoided concentration anomalies which can give rise to the production of undesirable by-products. In prior art processes where bromine is added to a reaction mass of styrenic polymer and catalyst, there is an anomalous zone, in the area of the bromine addition, in which the polymer sees an overabundance of bromine. In the case of adding separate bromine and styrenic polymer streams to a reactor containing a bromination catalyst, there will be two anomalous zones, one rich in bromine and the other rich in polymer. By not having the correct stoichiometry in these zones, there are introduced opportunities for the formation of undesirable by-products.

DESCRIPTION OF THE INVENTION

Figure 1:
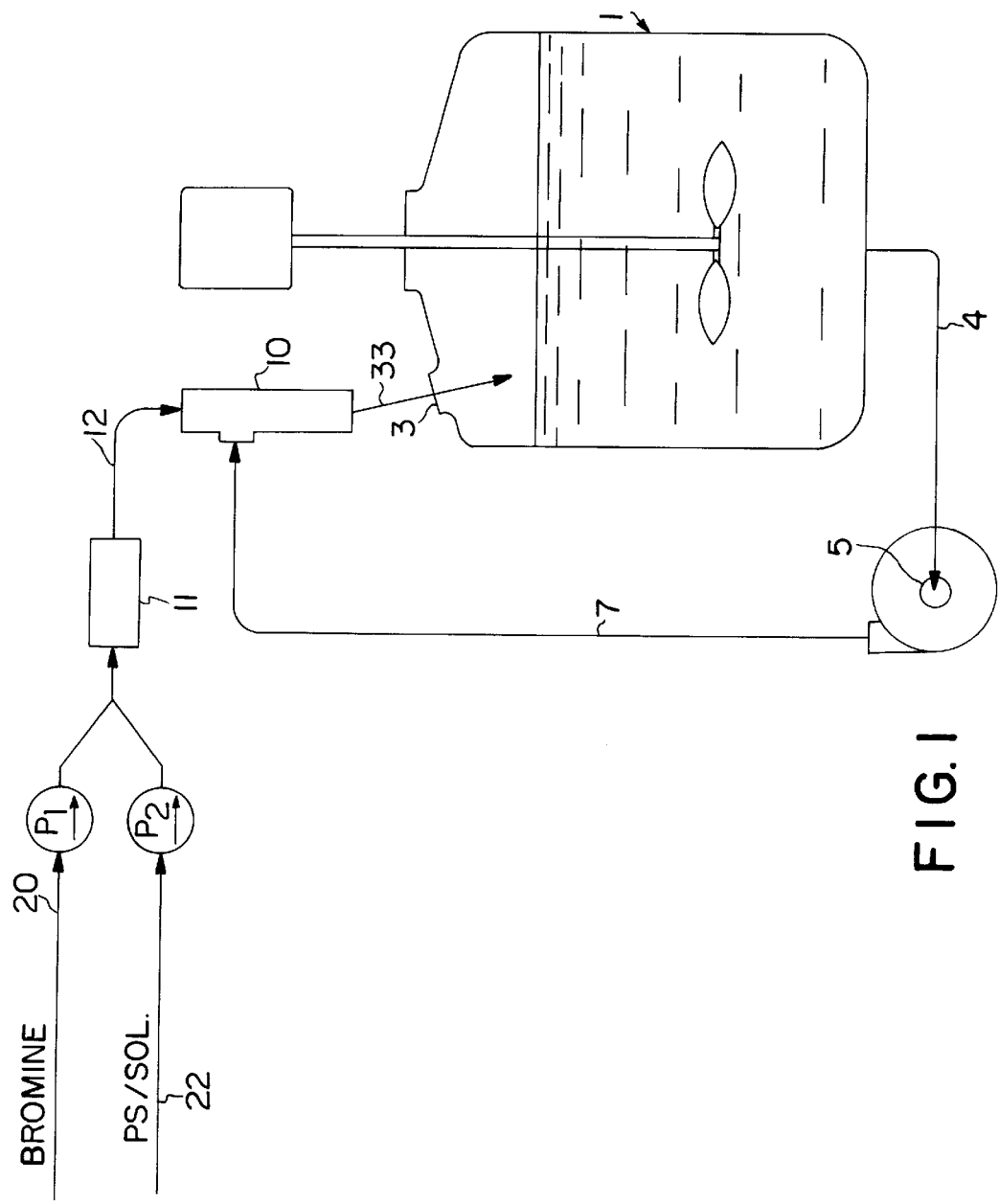
FIG. 1 is a schematic diagram depicting a process of this invention.

Styrenic polymers which are brominated in accordance with the present invention are homopolymers and copolymers of vinyl aromatic monomers, that is, monomers having an unsaturated moiety and an aromatic moiety. The preferred vinyl aromatic monomers have the formula:

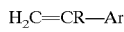

wherein R is hydrogen or an alkyl group having from 1 to 4 carbon atoms and Ar is an aromatic radical (including various alkyl and halo-ring-substituted aromatic units) of from 6 to 10 carbon atoms. Examples of such vinyl aromatic monomers are styrene, alpha-methylstyrene, ortho-methylstyrene, meta-methylstyrene, para-methylstyrene, para-ethylstyrene, isopropenyltoluene, isopropenylnaphthalene, vinyl toluene, vinyl naphthalene, vinyl biphenyl, vinyl anthracene, the dimethylstyrenes, t-butylstyrene, the several chlorostyrenes (such as the mono- and dichloro-variants), the several bromostyrenes (such as the mono-, dibromo- and tribromo-variants). Polystyrene is the currently preferred styrenic polymer and, when the styrenic polymer being brominated is a copolymer of two or more vinyl aromatic monomers, it is preferred that styrene be one of the monomers and that styrene comprise at least 50 weight percent of the copolymerizable vinyl aromatic monomers.

The styrenic polymers, which are brominated in accordance with the present invention, are readily prepared by bulk or mass, solution, suspension or emulsion polymerization techniques comparable to those employed in the polymerization of styrene. Polymerization can be effected in the presence of free radical, cationic or anionic initiators, such as di-t-butyl peroxide, azo-bis(isobutyronitrile), di-benzoyl peroxide, t-butyl perbenzoate, dicumyl peroxide, potassium persulfate, aluminum trichloride, boron trifluoride, etherate complexes, titanium tetrachloride, n-butyllithium, t-butyllithium, cumylpotassium, 1,3-trilithiocyclohexane, and the like. The polymerization of styrene, alone or in the presence of one or more monomers copolymerizable with styrene, is well known and it is considered unnecessary to further discuss the polymerization process. The styrenic polymers having a molecular weight of at least 1,000, preferably at least 50,000 and most preferably 150,000 to 500,000, are brominated in accordance with the present invention. Although styrenic polymers outside these molecular weight ranges can be brominated in accordance with the present invention, there is typically no economic advantage in so doing.

The catalyst used in the processes of this invention can be any bromination catalyst, provided that the catalyst does not act to frustrate the efficient and safe production of a high quality brominated polystyrenic product. The favored catalysts are the Lewis acid catalysts which are typified by $AlCl_3$, $FeCl_3$, $AlBr_3$, $FeBr_3$, $SbCl_5$, $ZrCl_4$, and the like. Fe, Al and $Sb_2O_3$ may be used to form Lewis acid catalysts by simply adding them to the reaction system. Mixtures of catalyst can also be used. Once the catalyst has been added to the reaction system, it may undergo some reaction without significant loss of catalytic activity, e.g., $AlCl_3$ may convert to some extent to $AlBr_3$. The more preferred catalysts are the aluminum and iron-based catalysts. Of these, the most preferred are the aluminum and iron halides, especially the bromides and chlorides. $AlCl_3$ and $FeCl_3$ are most highly preferred, with $AlCl_3$ being the catalyst of choice.

The catalyst is used in an amount which is sufficient to obtain the catalytic effect sought. These catalytic amounts will depend on the activity of the catalyst, but will generally fall within the range of from about 0.2 to about 20 weight percent and preferably within the range of from about 0.5 to about 15 weight percent, based on the weight of the styrenic polymer being brominated. The most active catalysts will be used in the lower amounts while the less active catalysts will be used in the higher amounts. For the preferred aluminum and iron-based catalysts, it is preferred that they be used in amounts within the range of from about 0.5 to about 5 weight percent. $AlCl_3$ and $FeCl_3$ are useful in amounts within the range of from about 0.2 to about 10 weight percent. When $AlCl_3$ is the catalyst, amounts within the range of from about 0.5 to about 3 weight percent are preferred.

The brominating agents useful in the process of this invention can be any of those which can brominate aromatic carbons in the polymer's vinyl aromatic units (hereinafter also referred to as styrenic monomer units). The art recognizes $Br_2$ and BrCl as good brominating agents, with the former being most preferred. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed, which will provide from 1 to 3 bromine substitutions per styrenic monomer unit in the polymer. Generally, it is desired that the brominated styrenic polymer products of this invention contain at least 30 wt % bromine, based upon the total weight of the brominated polymer. It is preferred that the brominated polymer contain above about 50 wt % bromine and most preferably above about 60 wt % bromine. For any particular styrenic polymer, the amount of brominating agent used in the process will be determined by the bromine content desired considering the highest bromine content which is obtainable with the process parameters chosen. The higher bromine contents will require the most brominating agent. It is pointed out that as perbromination is approached, it becomes more difficult to substitute the last bromines. Adding ever larger amounts of a brominating agent does not always attenuate this difficulty. However, it is helpful, in attempting to maximize the bromine content, to provide a small stoichiometric excess of brominating agent. Stoichiometric excesses up to about 10% are preferred. The stoichiometry is easily determined as it requires one mole of $Br_2$ or BrCl per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine or BrCl per styrenic monomer unit will be required, not including any desired stoichiometric excess. For brominated polystyrene, a bromine content of from about 40 to about 70+ wt % bromine is desirable. This range can be theoretically obtained with a mole ratio of bromine to styrenic monomer unit of from about 0.9:1 to about 3.0:1. Preferred for brominated polystyrene is a bromine content of from about 60 to about 70+ wt %, which can be obtained with a theoretical mole ratio of from about 1.9:1 to about 3.0:1 for bromine or BrCl. The processes of this invention can, with facility, provide up to 70 wt %, say 67–68 wt %, bromine. In determining the amount of brominating agent in the process, the brominating agent in the feed mixture and any brominating agent pre-added prior to the feed of the mixture are both counted. As pointed out herein, it is not necessary to pre-add a brominating agent to the catalyst and, thus, all of the process brominating agent requirements can be supplied via the feed of the mixture. If, however, the practitioner chooses to pre-add a brominating agent to the reactor, it can be done.

While the foregoing describes the overall quantitative relationship between the brominating agent and styrenic polymer, the quantitative relationship between these two reactants in the feed mixture has not been fully discussed. Generally, the mixture which is to be fed will contain from about 1 to about 8 moles of brominating agent per mole of styrenic monomer units at any time during the feed period. During the feed, the quantitative relationship can be constant or can vary within the above-mentioned range. (It is within the scope of this invention to allow for some excursions outside of the range so long as such does not do significant harm to the process efficiency or to product quality.) A preferred range is from about 2.5 to about 5 mole s of brominating agent per mole of styrenic monomer units in the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units, will result in exhaustion of either the brominating agent or the styrenic polymer as a mixture constituent before exhaustion of the other constituent. For example, if the practitioner chooses to produce brominated polystyrene with a 70 wt % bromine content, an overall molar ratio of bromine to styrenic monomer units of 3.0:1, and any excess if desired, would be suitable. If the practitioner chooses to form a feed mixture in which the molar ratio of bromine to styrenic monomer units is 1:1, it can be seen that the amount of polystyrene to be fed will be completed before obtaining the needed overall amount of bromine. In this case, the practitioner first uses the 1:1 mixture and then continues on with just a bromine feed after the polystyrene feed has been exhausted. If, on the other hand, the molar ratio in the feed mixture is chosen to be 5:1, then the bromine will first become exhausted and the feed will have to be finished with the polystyrene alone. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the process of this invention be essentially anhydrous, i.e., contain less than 100 ppm (weight basis) water and contain no more than 10 ppm organic impurities, e.g., oil, grease, carbonyl containing hydrocarbons, iron, and the like. Available, commercial grade bromine may have such purity. If, however, such is not available, the organic impurities and water content of the bromine can be conveniently reduced by mixing together a 3 to 1 volume ratio of bromine and concentrated (94–98 percent) sulfuric acid. A two-phase mix is formed which is stirred for 10–16 hours. After stirring and settling, the sulfuric acid phase, along with the impurities and water, is separated from the bromine phase. To further enhance the purity of the bromine, the recovered bromine phase can be subjected to distillation.

As before stated, it is preferred that the processes of this invention use a solvent. The solvent must be capable of solubilizing the styrenic polymer feed and underbrominated intermediates and be relatively inert to the process at reaction conditions. The solvent should also exhibit solubility of the underbrominated styrenic polymers and, in preferred cases, the final brominated product. Preferred solvents are those in which the bromination catalyst is also soluble, readily dispersed or readily suspended. Halogenated solvents are preferred and are exemplified by carbon tetrachloride, chloroform, tetrachloroethane, methylene chloride, dichloroethane, trichloroethylene, trichlorobenzene, methylene bromide, 1,2-dibromoethane, dichlorodifluoromethane, bromochloromethane, and mixtures thereof. Especially preferred are bromochloromethane, 1,2-dichloroethane and methylene chloride.

By forming a solution of solvent and styrenic polymer, the polymer becomes easy to handle and mix with bromine. The solutions of this invention preferably contain from about 5 to about 50 wt % polymer. More highly preferred are those which contain from about 5 to about 30 wt % polymer.

It is preferred to have the bromination catalyst, to which the bromine/styrenic polymer mixture is fed, to be in association with a liquid so that the catalyst can be in a solution, slurry, dispersion or suspension. Such will enhance reaction mass mixing and mass transfer qualities. It is expedient, but not necessary, to use the same liquid, i.e., solvent, that is used to form the styrenic polymer solution. Thus, in a preferred mode, processes of this invention will provide a mixture of halogenated solvent and catalyst in the reactor into which the styrenic polymer/brominating agent mixture can be fed. The mixture of halogenated solvent and catalyst is best described as a suspension. Generally, it is suitable to use from about 95 to about 99.9 wt % liquid and preferably from about 99 to about 99.8 wt %, based on the total weight of liquid and catalyst.

The solvent used to dissolve the styrenic polymer and the liquid used in association with the catalyst are preferably dry, that is, they contain less than about 200 ppm (weight basis) water between them and preferably less than about 150 or 100 ppm water. The presence of water is not desired as, in significant quantities, it can deactivate the catalyst to an undesirable extent. If, for some reason, the practitioner has large amounts of water in the process and dewatering is not practical, then it may be possible to overcome the situation by simply increasing the amount of catalyst used. For the process of this invention, it is not a feature to solely use water to avoid cross-linking as is taught in U.S. Pat. No. 4,200,703, but rather, this invention attenuates cross-linking by means which include its novel feeding technique.

The styrenic polymer/brominating agent mixture feed should occur expeditiously, with consideration being given to the ability of the process equipment to handle the heat load from the exothermic process, the evolving HBr, and other process concerns. In short, the feed can occur over the shortest time period that will be allowed by the equipment without excursion outside of critical process parameters. Generally, it is anticipated that the feed period will be from 0.5 to 3 hours for a commercial-size plant. Shorter feed periods are expected for smaller scale processes.

The process of this invention occurs at a temperature within the range of from about $-20°$ to about $60°$ C. and preferably within the range of from about $0°$ to about $10°$ C. The pressure can be atmospheric, subatmospheric or superatmospheric.

To carry out a process of this invention, a bromination catalyst, say $AlCl_3$, is suspended in essentially anhydrous bromochloromethane, to give an easily stirrable suspension. The suspension is prepared in a glass-lined, stirred reactor and brought to a temperature within the range of from about $-5°$ to about $10°$ C. The mix is kept under an inert, dry atmosphere in the reactor. A solution of a styrenic polymer and solvent, e.g., bromochloromethane, is prepared and intimately mixed with a bromine stream to yield a homogenous mixture. The cool mixture is fed into the stirred bromination catalyst suspension in the reactor. The intimate mixing of the styrenic polymer solution and brominating agent can be accomplished in a number of ways. For example, the solution and a brominating agent can be fed to a mixing device, e.g., a mixing nozzle, at the lower end of the dip tube in the reactor which extends to a point below the suspension level. The mixing device is designed to obtain the intimate mixing of the solution and brominating agent. Also, the mixing device acts to impart mixing energy, at the point of feed, to the intimate mixture and catalyst suspension. Another technique for obtaining intimate mixing of the styrenic polymer solution and brominating agent, is to use an exterior reactor loop having an in-line mixer, say an impingement mixer. Generally, the use of an exterior reactor loop includes first charging the reactor with a bromination catalyst slurry, suspension, etc., and then withdrawing from the reactor a stream which is then fed to a mixer external of the reactor. A mixture formed from at least bromine and styrenic polymer is also fed to the mixer to yield a second mixture which is formed from the two feeds to the mixer. The second mixture is subsequently fed back to the reactor. The stream withdrawn from the reactor will initially comprise the catalyst. After the second mixture is fed to the reactor and the process runs, the withdrawn stream will begin to comprise brominated polystyrene along with catalyst. As the process continues, the degree of bromination of the polystyrene will increase.

Exemplifying the use of an exterior reactor loop, reference is made to FIG. 1 wherein there is shown a reactor, generally designated by the numeral 1. Reactor 1 is a stirred reactor and initially contains a suspension comprising catalyst and solvent, say any of the preferred halogenated hydrocarbon solvents. Reactor discharge conduit 4 provides a stream from reactor 1 which is fed to pump 5. Pump 5 pressurizes the stream so that it is fed with force via conduit 7 to impingement mixer 10. Bromine is fed via conduit 20 to pump $P_1$ while, at the same time, a solution of polystyrene and solvent (preferably the same solvent as that which is in reactor 1) is fed via conduit 22 to pump $P_2$. Pumps $P_1$ and $P_2$ feed in-line mixer 11 to obtain an intimate mixture of bromine, polystyrene, and solvent. This intimate mixture is fed to impingement mixer 10, wherein it is intimately mixed with the stream from reactor 1. The discharge from impingement mixer 10 is fed via conduit 33 to reactor 1 through feed port 3. The removal of contents from reactor 1 and their feed to impingement mixer 10 continues to occur until at least substantially all of the bromine and polystyrene/solvent solution have been fed.

As can be appreciated, the contents of reactor 1 change in composition during the bromine and polystyrene/solvent solution feeds. Initially, the contents of reactor 1 comprise catalyst and solvent. As the process runs, the reactor contents comprise and begin to become more rich in brominated polystyrene, some of which is underbrominated and some of which is of the degree of bromination sought. During a cook period, the final bromination occurs. Removal of the reactor contents can continue to occur during the cook period to aid in mixing.

As pointed out earlier, the bromination of styrenic polymers is a substitution reaction. The main by-product from this reaction is HBr. The HBr formed in the process is usually found in the head space above the reactor contents. It is preferred that the HBr be removed and passed to a water scrubber or stored as dry HBr. A dry, inert gas, say nitrogen, can be used as a pad over the reactor contents to minimize the presence of water therein.

The reactor is kept at a low temperature, e.g., from about 0° to about 10° C., during the feed of the styrenic polymer and/or brominating feed, as the case may be, and preferably from about 4° to about 8° C.

After the feed is accomplished, the reactor is maintained for a cook period of from about 0.5 to about 6 hours and preferably from about 1 to about 3 hours. The cook temperature is within the range of from about 0° to about 10° C. and preferably within the range of from about 2° to about 5° C. The cook period serves to continue the bromination until the sought degree of bromination is obtained. It may be for a long period if the reaction parameters provide for mild bromination conditions during the bromine and polystyrene feeds or it may be for a short period if the parameters chosen provide for more severe bromination conditions. The cook period can occur in the reactor.

After the cook period, the reaction mass can be treated with water, sodium sulfite, sodium gluconate and sodium hydroxide to deactivate the catalyst, kill any remaining brominating agent and to adjust the reaction mass pH. After these treatments, the reaction mass is settled to obtain a two-phase reaction mass containing an organic phase, which contains, as a solute, the brominated styrenic polymer product and an aqueous phase. The aqueous phase is decanted and the remaining organic phase is stripped of its solvent component. It is most convenient to accomplish this strip by pouring the organic phase into boiling water. As the solvent is flashed off, the brominated styrenic polymer product forms a precipitate. The precipitate can be recovered by any liquid-solid separation technique, e.g., filtration, centrifugation, etc. The recovered precipitate is then dried.

The following Examples illustrate the features of this invention. The Delta E values, along with the L, a and b values from which it is derived, were obtained by transmission measurements made with a HunterLab Color Quest Spectrocolorimeter. The transmission cell provided a 20 mm path length. The software was set to report the color in units of "Delta E-lab". The standardization/calibration was based upon chlorobenzene and obtained by use of the instrument's black and white standard tiles. The brominated polystyrene sample to be tested was prepared by measuring 5 grams of the sample into a 50 ml centrifuge tube. Then, 45 grams of chlorobenzene was placed in the tube. The tube is shaken for 1 hour on a wrist-action shaker. If, after the shaking period has lapsed, the solution is not clear, it is centrifuged for 10 minutes at 4,000 rpm. If the solution is still not clear, it is then centrifuged another 10 minutes. If the solution is still not clear, then it cannot be analyzed. Assuming a clear solution, the solution is poured to fill the 20 mm cell for placement in the calorimeter. The calibrated instrument is set to report color as "Delta E-lab".

EXAMPLE I

A 0.910 g (6.82 mmol) portion of aluminum chloride was suspended (stirred at 250 rpm) in 190 g of dry (13 ppm water) bromochloromethane (BCM) in 1-L jacketed flask cooled to 0° C. by circulating glycol bath. A 419.86 g portion of a 10.00 wt % solution of polystyrene (403.1/n mmol) in dry BCM was pumped at a constant rate of 8.46 g/min (8.13 mmol/min) to a jacketed, glycol-cooled mixing tee mounted on the reaction flask. At the same time, bromine was pumped at a constant rate of 6.09 g/min (38.1 mmol/min) to the same mixing tee where it combined with the polystyrene solution (feed mol ratio $Br_2$/PS is 4.69) before dropping into the stirred catalyst suspension in the reaction flask. The bromine feed was stopped after 30.0 min (1143.5 mmol) and the polystyrene solution feed was stopped after 49.6 min (overall mol ratio of $Br_2$/PS is 2.84). A rinse of 160 g of dry BCM was used for the polystyrene solution feed system to assure complete transfer of the polymer to the reaction flask. The reaction temperature was maintained at 0°–5° C. throughout the addition and subsequent 2 hr cook period. The catalyst was deactivated by addition of 16.4 g of 10 wt % aqueous solution of sodium gluconate, and pH was adjusted to 14 by addition of 60.7 g of 10 wt % aqueous NaOH. The reaction mixture was washed with 10 wt % aqueous sodium sulfite followed by a water wash. The product was recovered from the organic phase by addition to vigorously stirred hot (90° C.) water. The solvent distilled from the hot water leaving a slurry of the brominated polystyrene product in water. After filtering, the powdery solid was rinsed with water and dried to constant weight in a vacuum oven (150° C./2 torr/5 hr). The dry solid weighed 127.08 g (95% yield). The product contained 68.7 wt % total Br and 3600 ppm hydrolyzable Br. The HunterLab solution color (10 wt % in chlorobenzene) values were L=94.58, a=−2.79, b=17.29, Delta E=18.34.

EXAMPLE II

A Y-shaped mixing apparatus having a cooling jacket was equipped with 2 feed lines, each connected to a pump. One of the feed lines was for delivering bromine and the other was for delivering a PS and BCM solution. Bromine (93.3 g, 31.3 ml or 0.583 mole), delivered at a rate of 1 ml/min (19.4 mmol/min), and a PS/BCM solution (22.4 g PS, 0.215 mole and 97 ml or 194 g of anhydrous BCM), delivered at 4 ml/min (7.17 mmol/min), were fed simultaneously from their respective feed lines into the cooled (5° C.) Y-mixing apparatus. The resultant intimate mixture from the mixing apparatus was then fed into a cooled (5° C.) suspension of 0.45 g (2 wt % based on PS) of aluminum chloride in 49 ml (98 g) of anhydrous BCM. Evolved HBr was scrubbed by a caustic solution during the reaction. The feeds were complete in 35 minutes and the mixture was cooked for 2 hours at 5° C. After water and sodium sulfite washes, solid BrPS was isolated by precipitating from 500 ml of hot (90° C.) water as described above. A total of 66 g of BrPS (97% yield) was obtained. The product contained 68.4 wt % total Br and 2800 ppm hydrolyzable Br. The HunterLab solution color (10 wt % in chlorobenzene) values were L=96.74, a=−1.90, b=15.99, Delta E=16.44.

The brominated styrenic polymers of this invention are suitable for use as flame retardants in thermoplastics, especially engineering thermoplastics, e.g., polybutylene terephthalate, polyethylene terephthalate, nylon and the like. These brominated polymers are used in flame retarding quantities, say from about 5 to about 20 wt % brominated polymer per hundred weight of thermoplastic. Conventional blending techniques can be used as taught in the prior art. In addition, conventional additives, such as UV stabilizers, impact modifiers, flame retardant synergists, dyes, pigments, fillers, plasticizers, flow aids, antioxidants, free radical initiators and the like, may be used as the need requires.

What is claimed:

1. A process for the bromination of polystyrene, which process comprises:
   a. feeding a mixture of a brominating agent and a solution of polystyrene to a reactor containing a bromination catalyst and associated liquid, in which
      i. the mixture is substantially free of a bromination catalyst;
      ii. the solvent used in forming the polystyrene solution and the liquid associated with the catalyst contains less than 200 ppm water between the two of them; and
      iii. the brominating agent contains less than about 100 ppm water.

2. The process of claim 1 wherein the solution solvent and the associated liquid are the same.

3. The process of claim 1 wherein the solution solvent is chosen from the group consisting of bromochloromethane, 1,2-dichloroethane and methylene chloride.

4. The process of claim 1 wherein the solution solvent is bromochloromethane.

5. The process of claim 1 wherein the brominating agent is bromine.

6. The process of claim 1 wherein the bromination catalyst is an aluminum or iron-based catalyst or a mixture of any of them.

7. The process of claim 1 wherein the bromination catalyst is an aluminum or iron halide or a mixture of any of them.

8. The process of claim 1 wherein the bromination catalyst is an aluminum or iron-based catalyst or a mixture of any of them and wherein the catalyst is used in an amount which is within the range of from about 0.5 to about 5 weight percent, based on the weight of the styrenic polymer being brominated.

9. The process of claim 1 wherein the bromination catalyst is $AlCl_3$ or $FeCl_3$ or a mixture of them and wherein the catalyst is used in an amount within the range of from about 0.2 to about 10 weight percent, based on the weight of the styrenic polymer being brominated.

10. The process of claim 1 wherein the bromination catalyst is $AlCl_3$ and wherein the catalyst is used in an amount within the range of from about 0.5 to about 3 weight percent, based on the weight of the styrenic polymer being brominated.

11. The process of claim 1 wherein the solution solvent is bromochloromethane, the bromination catalyst is $AlCl_3$ and wherein the catalyst is used in an amount within the range of from about 0.2 to about 10 weight percent, based on the weight of the styrenic polymer being brominated.

12. The process of claim 11 wherein the amount of catalyst used is within the range of from about 0.5 to about 3 weight percent, based on the weight of the styrenic polymer being brominated.

13. A process for the bromination of polystyrene, which process comprises:
   a. providing a bromination catalyst and associated liquid in a reactor and feeding a portion of the bromination catalyst and associated liquid to a mixer external of the reactor;
   b. feeding a brominating agent and a solution of polystyrene as a mixture to the external mixer, in which
      i. the mixture or individual streams, as the case may be, prior to being fed to the external mixer, are substantially free of a bromination catalyst;
      ii. the solvent used in forming the polystyrene solution and the liquid associated with the catalyst contains less than 200 ppm water between the two of them; and
      iii. the brominating agent contains less than about 100 ppm water.

14. A process for the bromination of polystyrene, which process comprises:
   a. providing a bromination catalyst and associated liquid in a reactor; and
   b. feeding a brominating agent and a solution of polystyrene to a mixing nozzle which is within the reactor interior, in which
      i. the brominating agent and the polystyrene solution fed to the mixing nozzle are substantially free of a bromination catalyst;
      ii. the solvent used in forming the polystyrene solution and the liquid associated with the catalyst contains less than 200 ppm water between the two of them; and
      iii. the brominating agent contains less than about 100 ppm water.

15. The process of claim 1 wherein the solvent contains less than 150 ppm water.

16. The process of claim 1 wherein the solvent contains less than 100 ppm water.

17. The process of claim 14 wherein the solution solvent and the associated liquid are the same.

18. The process of claim 14 wherein the solution solvent is chosen from the group consisting of bromochloromethane, 1,2-dichloroethane and methylene chloride.

19. The process of claim 14 wherein the solution solvent is bromochloromethane.

20. The process of claim 14 wherein the brominating agent is bromine.

21. The process of claim 14 wherein the bromination catalyst is an aluminum or iron-based catalyst or a mixture of any of them.

22. The process of claim 14 wherein the bromination catalyst is an aluminum or iron halide or a mixture of any of them.

23. The process of claim 14 wherein the bromination catalyst is an aluminum or iron-based catalyst or a mixture of any of them and wherein the catalyst is used in an amount which is within the range of from about 0.5 to about 5 weight percent, based on the weight of the styrenic polymer being brominated.

24. The process of claim 14 wherein the bromination catalyst is $AlCl_3$ or $FeCl_3$ or a mixture of them and wherein the catalyst is used in an amount within the range of from about 0.2 to about 10 weight percent, based on the weight of the styrenic polymer being brominated.

25. The process of claim 14 wherein the bromination catalyst is $AlCl_3$ and wherein the catalyst is used in an amount within the range of from about 0.5 to about 3 weight percent, based on the weight of the styrenic polymer being brominated.

26. The process of claim 14 wherein the solution solvent is bromochloromethane, the bromination catalyst is $AlCl_3$ and wherein the catalyst is used in an amount within the range of from about 0.2 to about 10 weight percent, based on the weight of the styrenic polymer being brominated.

27. The process of claim 26 wherein the amount of catalyst used is within the range of from about 0.5 to about 3 weight percent, based on the weight of the styrenic polymer being brominated.

28. The process of claim 14 wherein the solvent contains less than 150 ppm water.

29. The process of claim 14 wherein the solvent contains less than 100 ppm water.

* * * * *